(12) United States Patent
Tasaka et al.

(10) Patent No.: US 7,637,844 B2
(45) Date of Patent: Dec. 29, 2009

(54) AUTOMATIC TRANSMISSION CONTROL SYSTEM

(75) Inventors: Hajime Tasaka, Fuji (JP); Fumitaka Nagashima, Fuji (JP); Hirofumi Michioka, Fujisawa (JP)

(73) Assignee: JATCO Ltd, Fuji-shi (JP)

( * ) Notice: Subject to any disclaimer, the term of this patent is extended or adjusted under 35 U.S.C. 154(b) by 531 days.

(21) Appl. No.: 11/644,957

(22) Filed: Dec. 26, 2006

(65) Prior Publication Data

US 2007/0213164 A1 Sep. 13, 2007

(30) Foreign Application Priority Data

Jan. 26, 2006 (JP) ............................. 2006-017018

(51) Int. Cl.
*B60W 10/04* (2006.01)
(52) U.S. Cl. ...................................... 477/107; 477/906
(58) Field of Classification Search .................. 477/107, 477/109, 906
See application file for complete search history.

(56) References Cited

U.S. PATENT DOCUMENTS 5,885,187 A * 3/1999 Tabata ........................ 477/107
5,921,885 A * 7/1999 Tabata et al. ................. 477/107
6,319,170 B1 * 11/2001 Hubbard et al. ............. 477/107

FOREIGN PATENT DOCUMENTS

JP 2003-254429 A 9/2003
JP 2005-163916 A 6/2005

* cited by examiner

*Primary Examiner*—Dirk Wright
(74) *Attorney, Agent, or Firm*—Global IP Counselors, LLP (57) ABSTRACT

An automatic transmission control system is provided with a disengagement malfunction determining section and a disengagement malfunction preventing section in an automatic transmission in which the frictional engaging elements are selectively engaged and disengaged to change a rotational speed of a main power source. The disengagement malfunction determining section determines a disengagement malfunction with a first frictional engaging element from among a plurality of frictional engaging elements of the automatic transmission. The disengagement malfunction preventing section prevents disengagement malfunction of a second frictional engaging element from among the frictional engaging elements of the automatic transmission by lowering the rotational speed of the main power source to a level which will prevent the disengagement malfunction in the second frictional engaging element, when the disengagement malfunction determining section determines that the disengagement malfunction of the first frictional engaging element exist while the automatic transmission is in non-running range.

6 Claims, 6 Drawing Sheets

| | L/C | 3-5R/C | H/C | L&R/B | 2-6/B | L/OWC |
|---|---|---|---|---|---|---|
| 1st | ○ | | | ⊗ | | ● |
| 2nd | ○ | | | | ○ | |
| 3rd | ○ | ○ | | | | |
| 4th | ○ | | ○ | | | |
| 5th | | ○ | ○ | | | |
| 6th | | | ○ | | ○ | |
| Rev | | ○ | | | | |

⊗: ENGINE BRAKE

AUTOMATIC TRANSMISSION CONTROL SYSTEM

CROSS-REFERENCE TO RELATED APPLICATIONS

This application claims priority to Japanese Patent Application No. 2006-017018, filed on Jan. 26, 2006. The entire disclosure of Japanese Patent Application No. 2006-017018 is hereby incorporated herein by reference.

BACKGROUND OF THE INVENTION

1. Field of the Invention

The present invention generally relates to a control system for an automatic transmission. More specifically, the present invention relates to an automatic transmission control system for preventing disengagement malfunction of a frictional engaging element.

2. Background Information

In a geared automatic transmission in which each of gear ratios is achieved by selectively engaging and releasing a plurality of clutches and brakes (each generically referred to as a "frictional engaging element") a disengagement malfunction of one (first) frictional engaging element (for example, it is adhered) may cause a secondary malfunction of a disengagement malfunction of another (second) frictional engaging element. Hereinafter, the phrase "disengagement malfunction" of a frictional engaging element refers to a malfunction in which a frictional engaging element remains engaged irrespective of a release command, encompassing not only a state in which it remains fully engaged (no relative rotation) but also a state in which it remains partially engaged to allow transmission of a portion of power.

In particular, when a certain one clutch or brake is involved in a disengagement malfunction, pressing down the accelerator pedal with a parking range (hereinafter, P range) or a neutral range (hereinafter, N range) being selected will cause the engine rotational speed to increase to a high engine rotational speed range because the engine is running with no load. In this situation, the disengagement malfunction of the first frictional engaging element may result in a case in which another (second) frictional engaging element (clutch or brake) is forced to rotate at a high speed. This high rotational speed poses a problem in that the second frictional engaging element (clutch or brake), which was operating normally, will become stuck resulting in a secondary disengagement malfunction.

In the case of automatic transmissions, which include a planetary gearing, such as the ones described in Japanese Laid-Open Patent Publication Nos. 2003-254429 and JP2005-163916A, when a clutch (e.g., a first frictional engaging element) is malfunctioning and can not be disengaged, if the accelerator pedal is depressed with a P range or a N range being selected, then the engine rotational speed will increase to a high engine rotational speed range as mentioned above. In particular, in these conventional automatic transmissions, with rotation of a ring gear that is an output rotary member held at zero, a sun gear and a rotary member that is fixed to the sun gear will rotate excessively, resulting in a brake (e.g., a second frictional engaging element), which is fixed to the above-mentioned rotary member, to become stuck due to frictional heat, and thus, malfunctioning (i.e., remaining engaged or partially engaged).

Therefore, in these conventional automatic transmissions, one of the frictional engaging elements is produced with a torque transmission capacity higher than required for normal torque transmission in order to avoid occurrence of disengagement malfunction in this the frictional engaging element. In other words, the frictional engaging element is produced with additional capacity to prevent the disengagement malfunction due to another frictional engaging element having a disengagement malfunction.

In view of the above, it will be apparent to those skilled in the art from this disclosure that there exists a need for an improved automatic transmission control system. This invention addresses this need in the art as well as other needs, which will become apparent to those skilled in the art from this disclosure.

SUMMARY OF THE INVENTION

It has been discovered that raising the capacity of one frictional engaging element than required will lead to increased cost in manufacturing the automatic transmission. Also by increasing the capacity of one frictional engaging element may cause inconveniences in the freedom of the layout of the automatic transmission as well as performance of the automatic transmission.

In view of the above-mentioned issues, one object to provide an automatic transmission control system for an automatic transmission which detects an event in time when a disengagement malfunction of a first frictional engaging element occurred, and prevents a disengagement malfunction of a second frictional engaging element, without raising a required torque transmission capacity of the second frictional engaging elements higher than needed.

In order to achieve the aforementioned object and other potential objects, an automatic transmission control system is provided that basically comprises a disengagement malfunction determining section and a disengagement malfunction preventing section. The disengagement malfunction determining section is configured to determine a disengagement malfunction with a first frictional engaging element from among a plurality of frictional engaging elements of an automatic transmission in which the frictional engaging elements are selectively engaged and disengaged to change a rotational speed of a main power source. The disengagement malfunction preventing section is configured to prevent disengagement malfunction of a second frictional engaging element from among the frictional engaging elements of the automatic transmission by lowering the rotational speed of the main power source to a level which will prevent the disengagement malfunction in the second frictional engaging element, when the disengagement malfunction determining section determines that the disengagement malfunction of the first frictional engaging element exist while the automatic transmission is in non-running range.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
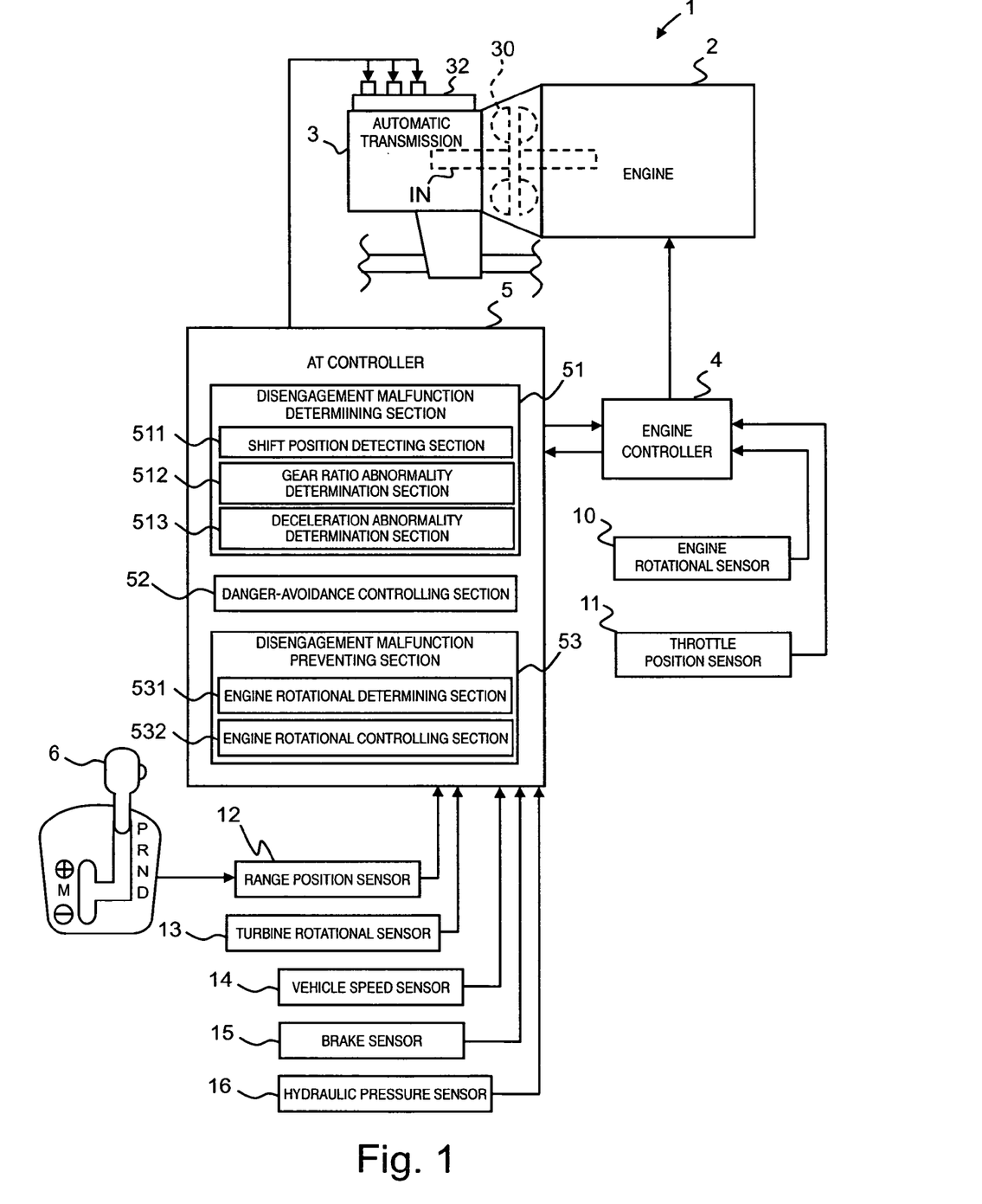
FIG. 1 is a schematic view of a vehicle power train of a vehicle equipped with an automatic transmission control system in accordance with a first embodiment of the present invention.

Referring initially to FIG. 1, a vehicle power train 1 is schematically illustrated that is equipped with an automatic transmission control system in accordance with a first embodiment of the present invention. The vehicle power train 1 has an engine 2 that is a main power source, an automatic transmission 3, an engine controller 4, an automatic transmission controller 5, a gear position selection lever 6 and various sensors 10~16. The automatic transmission 3, which features transverse mounting for a front engine front drive system, has a torque converter 30, a change-speed planetary gearing 31 (see FIG. 3), a final gear (not shown) and a differential gear (not shown). Via the torque converter 30, engine torque is input to an input shaft IN of the automatic transmission 3. The change-speed planetary gearing 31 changes speed of input rotation at a gear ratio of a selected one of shifting steps, transmitting torque to an output shaft (not shown).

The various sensors 10~16 includes an engine rotational speed sensor 10, a throttle position sensor 11, a range position sensor 12, a turbine speed sensor 13, a vehicle speed sensor 14, a brake sensor (a brake pedal switch) 15 and a hydraulic pressure sensor or switch 16. The engine rotational speed sensor 10 is configured and arranged to detect an engine rotational speed of the engine 2, and produce a control signal indicative of the engine rotational speed of the engine 2 that is sent to the engine controller 4.

The throttle position sensor 11 is configured and arranged to detect a throttle position, and produce a control signal indicative of the throttle position that is sent to the engine controller 4. The range position sensor 12 is configured and arranged to detect the range which has been selected by a driver manipulation of the gear position selection lever 6 or the shifting steps which has been selected, and produce a control signal indicative of the selected gear range position that is sent to the automatic transmission controller 5. The turbine speed sensor 13 is configured and arranged to detect rotational speed of the automatic transmission input shaft IN, and produce a control signal indicative of the rotational speed of the turbine 30 that is sent to the automatic transmission controller 5. The vehicle speed sensor 14 is configured and arranged to detect the rotational speed of the automatic transmission output shaft, and produce a control signal indicative of the vehicle speed that is sent to the automatic transmission controller 5. The brake sensor 15 is configured and arranged to detect the driver depressing the brake pedal, and produce a control signal indicative of the driver depressing the brake pedal that is sent to the automatic transmission controller 5. The hydraulic pressure sensor 16 is configured and arranged to detect a hydraulic pressure (described later), and produce a control signal indicative of the hydraulic pressure that is sent to the automatic transmission controller 5.

Thus, the engine controller 4 receives the detected signals from the engine rotational speed sensor 10 and the throttle position sensor 11, and outputs control signal for the engine 2 for controlling the engine rotational speed and etc. In addition, it outputs an engine rotational speed signal and a throttle position signal for the automatic transmission controller 5.

The automatic transmission controller 5 performs shifting control. That is to say, firstly, the automatic transmission controller 5 determines a target shifting step by referring to a shift schedule, which has been set beforehand and memorized therein, based on the vehicle speed signal and throttle position signal. Secondary, the automatic transmission controller 5 outputs a shift command signal for the automatic transmission 3, executing a shift by controlling engagement and release (disengagement) of the frictional engaging elements, accomplishing the above-mentioned target shifting step.

In addition, the automatic transmission controller 5 inputs the respective detected signals from the range position sensor 12, the turbine speed sensor 13, the vehicle speed sensor 14, the brake switch 15 and the hydraulic fluid pressure sensor 16 and carries out operation processing based on these signals. In this first embodiment, the automatic transmission controller 5 calculates vehicle speed and vehicle deceleration based on the rotational speed of the output shaft speed detected by the vehicle speed sensor 14. In addition, the automatic transmission controller 5 calculates a gear ratio based on the turbine rotational speed detected by the turbine speed sensor 13 and the output shaft rotational speed detected by the vehicle speed sensor 14.

The controllers 4 and 5 each preferably include a microcomputer with a control program that controls the power train 1 as discussed below. The controllers 4 and 5 also include other conventional components such as an input interface circuit, an output interface circuit, and storage devices such as a ROM (Read Only Memory) device and a RAM (Random Access Memory) device. While the controllers 4 and 5 are shown as separate units, the controllers 4 and 5 can be a single integrated unit. It will be apparent to those skilled in the art from this disclosure that the precise structure and algorithms for the controllers 4 and 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
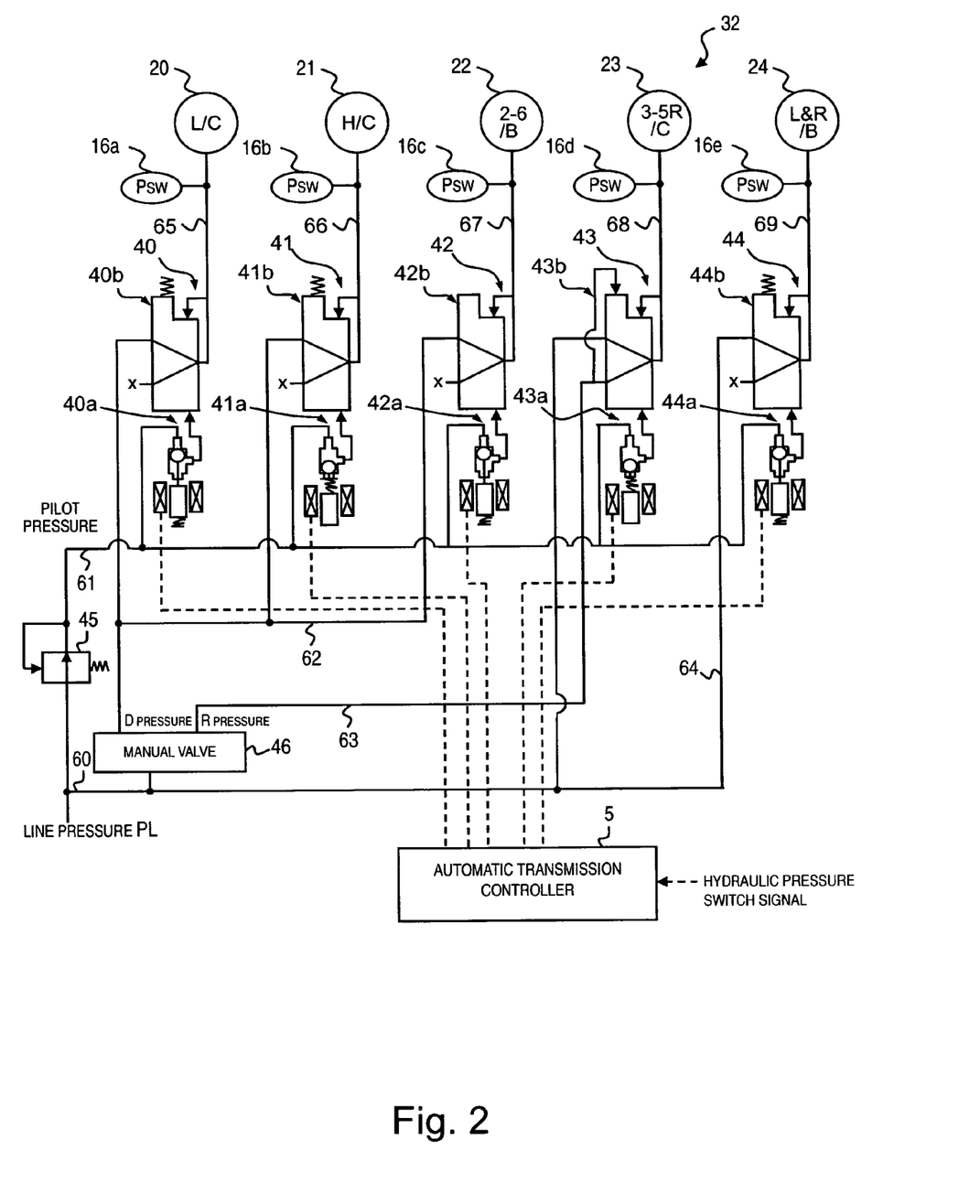
FIG. 2 is a hydraulic pressure circuit diagram of the automatic transmission in accordance with the first embodiment of the present invention.

FIG. 2 shows a hydraulic pressure circuit 32 via which the automatic transmission controller 5 controls engagement and release of the frictional engaging elements. The hydraulic pressure circuit 32 is provided with a plurality of hydraulic pressure control valves 40~44 for the respective plurality of frictional engaging elements. The automatic transmission controller 5 outputs signals to these hydraulic pressure control valves 40~44, controlling open or close of them, controlling hydraulic pressures supplied to the frictional engaging elements.

Each element, namely, a low clutch L/C, a high clutch H/C, a 2-6 brake 2-6/B, a 3-5 reverse clutch 3-5R/C, and a low & reverse brake L&R/B, is engaged when a D range pressure or a R range pressure, which is an engagement pressure, is supplied to its piston chamber 20~24 and the element is released when the pressure is drained from the piston chamber.

Line pressure PL is supplied to a manual valve 46 via a line-pressure hydraulic line 60. A D range pressure, which appears only when a D range position is selected, and an R range pressure, which appears only when an R range position is selected, is the line pressure PL which appears after passing through the manual valve 46. In addition, the line pressure PL is supplied also to a pilot valve 45, and the pilot valve 45 regulates the line pressure PL to let a pilot pressure occur.

The hydraulic pressure control valves 40~44, namely the first~fifth hydraulic control valves, for the respective frictional engaging elements control engagement pressures supplied to the above-mentioned engagement piston chambers 20~24, respectively. The first~third hydraulic pressure control valves 40~42 are supplied with D range pressure coming from the manual valve 46 through a D range pressure hydraulic line 62. It is made possible that the fourth hydraulic pressure control valve 43 is supplied with the line pressure PL directly or it is supplied with R range pressure coming from the manual valve 46. The fifth hydraulic pressure control valve 44 is supplied with the line pressure PL directly. In addition, each of the hydraulic pressure control valves 40~44 is supplied with the pilot pressure coming through the pilot pressure hydraulic line 61.

The first hydraulic pressure control valve 40 includes a duty solenoid 40a and a hydraulic pressure regulator valve 40b. Likewise, the second~fifth hydraulic pressure control valves 41~44 include duty solenoids 41a~44a and hydraulic pressure regulator valves 41b~44b, respectively. Using the pilot pressure as a base pressure, the duty solenoids 40a~44a produce the respective shift control pressures depending on the respective solenoid forces.

Using D range pressure as a base pressure and the above-mentioned shift control pressures and feedback pressures as working signal pressures, the hydraulic pressure regulator valves 40b~42b of the first~third pressure control valves 40~42 regulate engaging pressures applied to the engaging piston chambers 20~22, respectively.

Using line pressure PL as a base pressure and the shift control pressure and feedback pressure as working signal pressures, the hydraulic pressure regulator valve 43b of the fourth pressure control valve 43 regulates engaging pressure applied to the engaging piston chamber 23 when the D range position is selected. On the other hand, using R range pressure as a working signal pressure, it supplies line pressure PL, which is R range pressure, to the 3-5 reverse clutch 3-5R/C as it is when the R range position is selected.

Using line pressure PL as a base pressure and the shift control pressure and feedback pressure as working signal pressures, the hydraulic pressure regulator valve 44b of the fifth hydraulic pressure control valve 44 regulates engaging pressure applied to the engaging piston chamber 24.

Hydraulic lines 65~69, which connect the respective hydraulic pressure control valves 40~44 to the associated engaging piston chambers 20~24, are equipped with hydraulic pressure switches 16a~16e for the frictional engaging elements, respectively. The hydraulic pressure switches 16a~16e detect whether or not the engaging pressures supplied to the respective frictional engaging elements are greater than or equal to a predetermined value, outputting an ON switch signal indicative of presence of engaging pressure (greater than or equal to the predetermined value) or an OFF switch signal indicative of absence of engaging pressure (less than the predetermined value) to the automatic transmission controller 5.

As shown in FIG. 1, the automatic transmission controller 5 outputs a control signal to the engine controller 4, controlling the engine 2 through the engine controller 4.

The automatic transmission 3 is equipped with the select lever 6, making it possible for the driver to perform selection of each of P (parking) range, R (reverse) range, N (neutral) range, D (drive) range and M (manual) range manually by operating this select lever 6.

The range position sensor 12 such as an inhibitor switch converts operation of the select lever 6 into a range position signal, outputting this range position signal to the automatic transmission controller 5.

When D range is selected, an automatic shifting control of six shifting steps, 1 speed~6 speed, is performed based on a shift command signal for the automatic transmission 3, which is outputted in accordance with a shift schedule.

When M range is selected, the automatic shifting control is not operated, allowing, irrespective of the shift schedule, a shift to a shifting step that is selected by the select lever 6. Selecting the M range makes engine braking effective while driving in first gear (speed). The range position sensor 12 converts selection of a shifting step into a shift position signal, outputting this shift position signal to the automatic transmission controller 5.

Figure 3:
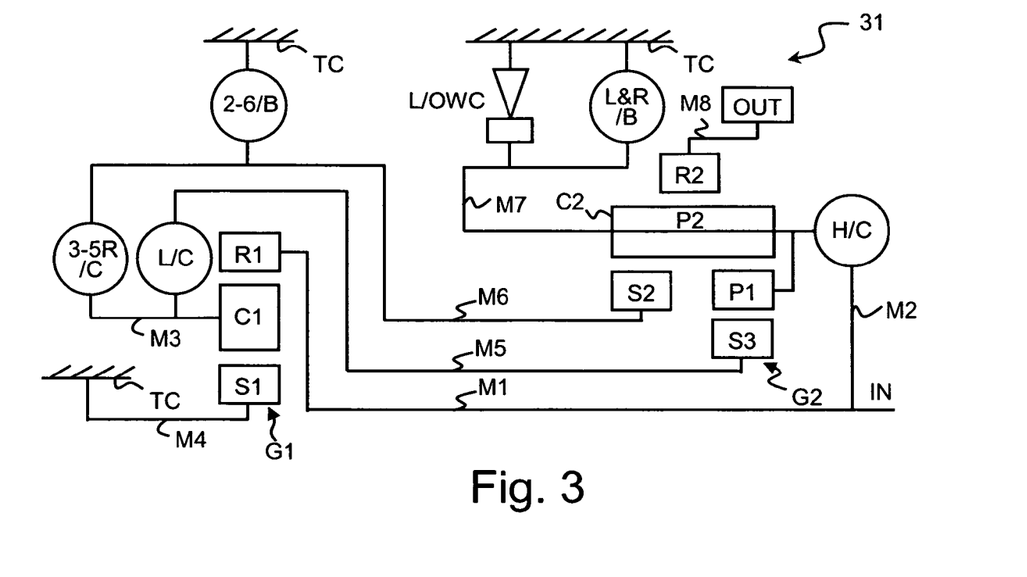
FIG. 3 is a schematic skeleton diagram illustrating a change-speed planetary gearing of the automatic transmission that is used with the automatic transmission control system in accordance with the illustrated embodiment of the present invention.

FIG. 3 is a skeleton diagram showing a power train of the change-speed planetary gearing 31 of the automatic transmission 3.

The change-speed planetary gearing 31 includes a simple planetary gear set G1 and a Ravigneaux planetary gear set G2. The planetary gear set G1 includes a first sun gear S1, a first carrier C1, and a first ring gear R1, providing a reduced rotation, as an input, to the planetary gear set G2. The planetary gear set G2 includes a large diameter second sun gear S2, a small diameter third sun gear S3, a second carrier C2, and a second ring gear R2. The second carrier C2 supports a plurality of pairs, each pair including a short pinion P1 and a long pinion P2. Each short pinion P1 meshes with the third sun gear S3 and each long pinion P2 meshes with the second sun gear S2.

The input shaft IN, which inputs engine torque via a torque converter, is directly connected to the first ring gear R1 via a first member M1. In addition, the inputs shaft IN is connected to the second carrier C2 via a second member M2 and a high clutch H/C.

The first carrier C1 is connected to the third sun gear S3 via a third member M3, a low clutch L/C and a fifth member M5. In addition, the first carrier C1 is connected to the second sun gear S2 via the third member M3, a 3-5 reverse clutch 3-5R/C and a sixth member M6.

The first sun gear S1 is fixed to a transmission case TC via a fourth member M4. A sixth member M6 can be fixed to and released from its fixed connection to the transmission case TC via a 2-6 brake 2-6/B.

The second carrier C2 is rotatably supported with respect to the transmission case TC via a seventh member M7 and a low reverse brake L&R/B such that its rotation can be fixed or released. In addition, the second carrier C2 is rotatably supported for rotation in one direction only with respect to the transmission case TC via the seventh member M7 and a low one-way clutch L/OWC such that its direction of rotation can be regulated. The low & reverse brake L&R/B and low one-way clutch L/OWC are arranged in parallel such that one operation of the two can be selected.

The second ring gear R2 is connected to an output gear OUT via an eighth member M8.

Figure 4:
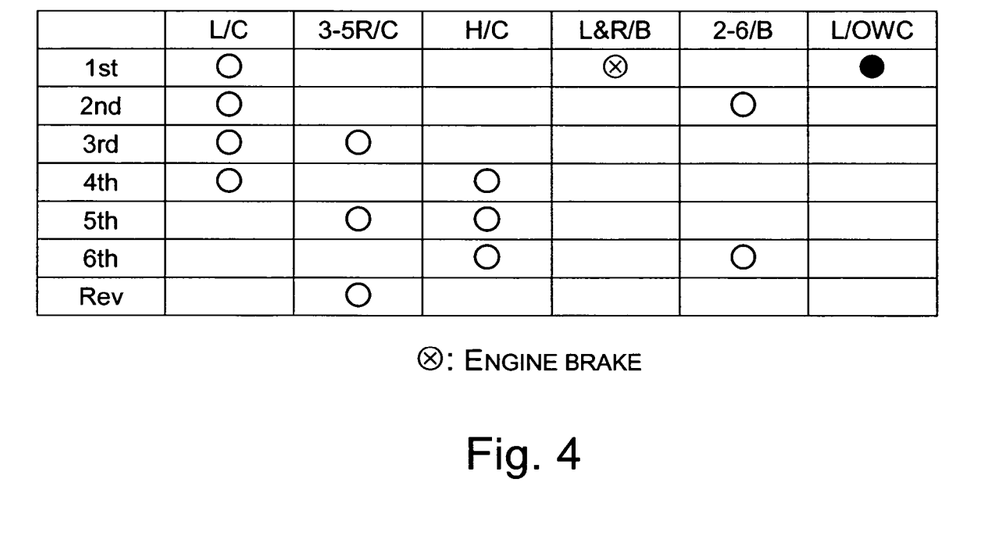
FIG. 4 is a frictional (clutch and brake) engagement operating chart for the automatic transmission that is used with the automatic transmission control system in accordance with the illustrated embodiment of the present invention for showing the relationship between a combination of engagement and release of each of the transmission frictional engagement elements and each shifting step.

The automatic transmission 3, which has been constituted as mentioned above, realizes shifting steps, 6-speed (1st~6th) forward and 1-speed reverse (Rev) by engaging or releasing each of the frictional engaging elements in accordance with various combinations as shown in FIG. 4. In FIG. 4, a ○ mark indicates that a frictional engaging element is engaged; a no-mark indicates that a frictional engaging element is released; a Ⓧ mark indicates that engagement of a frictional engaging element is effective during engine braking; and a ● mark indicates that a frictional engaging element is mechanically engaged (rotation regulation) only during engine driving.

Figure 5:
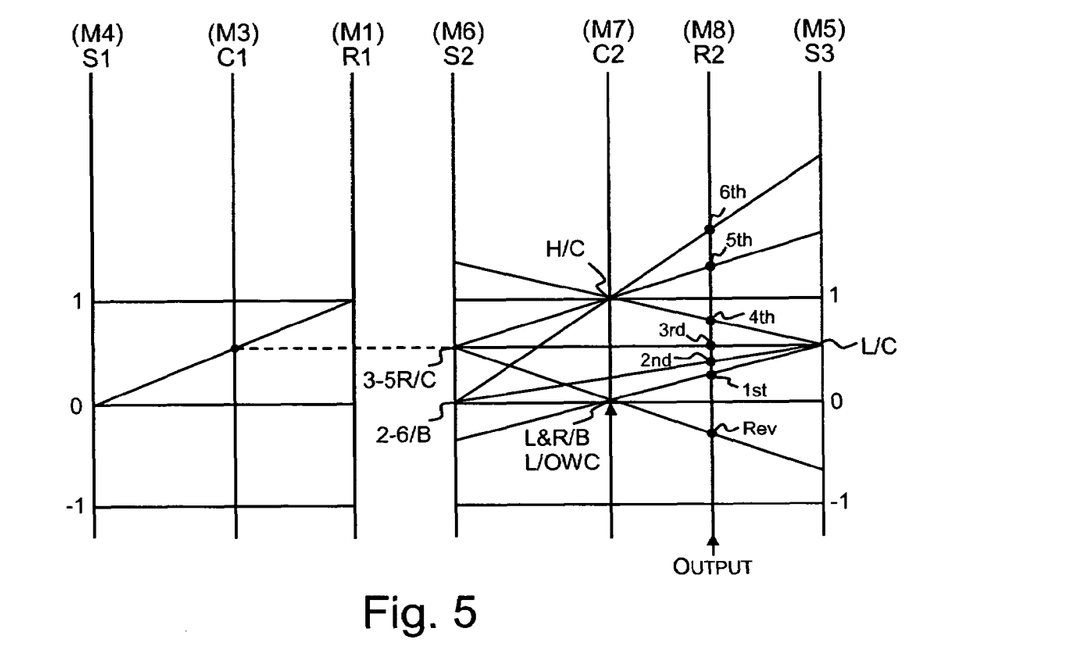
FIG. 5 is a speed shifting diagram representing operation of the change-speed planetary gearing.

FIG. 5 shows how the change-speed planetary gearing 31 works due to engagement or release of each frictional engaging element in a speed diagram (collinear diagram). This speed diagram has a plurality of parallel vertical axes. These parallel vertical axes indicate the frictional engaging elements, respectively, by the corresponding reference characters that have been placed near top ends thereof, and they indicate the rotary elements also, which are connected directly to these elements, by the reference characters that have been written in parentheses. The speed diagram shows a gear ratio between any two of these frictional engaging elements also by a width between the two of the parallel vertical axes which indicate the two frictional engaging elements. The speed diagram shows the speed ratio of each of these frictional engaging elements which assumes input rotational speed, which is applied to the change-speed planetary gearing 31, (rotational speed of the input shaft IN) 1 by length along the one of the parallel vertical axes which indicates the element. A positive value on each vertical axis indicates a rotation of the frictional engaging element which is indicated by the vertical axis in the same direction as the input shaft IN, and a negative value on the vertical axis indicates a rotation of the frictional engaging element in the opposite direction to the input shaft IN. A ● mark indicates that each frictional engaging element is engaged, and a ○ mark indicates an output rotation at the shifting step.

Next, referring to FIGS. 3~5, there is a description of a rotation transmission path at each of shifting steps.

Shifting steps at low speed side, namely first, second, and third speed, are accomplished by selectively engaging other frictional engaging elements together with engaging the low clutch L/C, so a reduced speed rotation is fed to the third sun gear S3 when the low clutch L/C is engaged, it is subjected to a further change in speed due to selectively engaging other frictional engaging elements, and the further changed reduced speed rotation is outputted to an output gear OUT.

First speed (1st) is accomplished by engaging the low & reverse brake L&R/B or the low one-way clutch L/WC together with engaging the low clutch L/C.

Engine rotation is reduced in the process of passing from the input shaft IN through the first member M1 and the planetary gear set G1, and then it passes from the third member M3 through the low clutch L/C and the fifth member M5 to, as an input, the third sun gear S3. In the second planetary gear set G2, receiving a reaction force by the second carrier C2 that is anchored to the transmission case TC due to engagement of the low one-way clutch L/OWC, the second ring gear R2 rotates at reduced speeds, outputting the reduced rotation at the greatest reduction ratio from the output gear OUT via the eighth member M8. In addition, for engine braking, the low & reverse brake L&R/B is applied to replace the low one-way clutch L/OWC that is idling, receiving torque to generate a reaction force.

Second speed (2nd) is accomplished by engaging the 2-6 brake 2-6/B together with engaging the low one-way clutch L/OWC.

Rotation that has been reduced in the process of passing from the input shaft IN through the first member M1 and the planetary gear set G1 passes from the third member M3 through the low clutch L/C and the fifth member M5 to, as an input, the third sun gear S3.

In the second planetary gear set G2, receiving a reaction force by the second sun S2 that is anchored to the transmission case TC due to engagement of the 2-6 brake 2-6/B, the second ring gear R2 rotates at reduced speeds, outputting the reduced rotation at a reduction ratio, which is smaller than the greatest reduction ratio for first speed, from the output gear OUT via the eighth member M8.

Third speed (3rd) is accomplished by engaging the 3-5 reverse clutch 3-5R/C together with engaging the low clutch L/C.

Rotation that has been reduced in the process of passing from the input shaft IN through the first member M1 and the planetary gear set G1 passes from the third member M3 through the low clutch L/C and the fifth member M5 to, as an input, the third sun gear S3.

In addition, from the third member M3, the above-mentioned rotation that has been reduced passes through the 3-5 reverse clutch 3-5R/C and the sixth member M6 to, as an input, the second sun gear S2.

As a result, the second ring gear R2 rotates at the same speed (rpm) as both of the sun gears S2 and S3 because the Ravigneaux planetary gear set G2 is locked, outputting the reduced rotation at a reduction ratio, which is smaller than the reduction ratio for second speed, from the output gear OUT via the eighth member M8.

Shifting steps at low high side, namely fourth, fifth, and sixth speed, are accomplished by selectively engaging other frictional engaging elements together with engaging the high clutch H/C, so an unreduced speed rotation is fed to the second carrier C2 when the high clutch H/C is engaged, it is subjected to a change in speed due to selectively engaging other frictional engaging elements, and the changed speed rotation is outputted to the output gear OUT.

Fourth speed is accomplished by engaging the low clutch L/C and the high clutch H/C.

Rotation that has been reduced in the process of passing from the input shaft IN through the first member M1 and the planetary gear set G1 passes from the third member M3 through the low clutch L/C and the fifth member M5 to, as an input, the third sun gear S3.

Furthermore, rotation that has the same rotational speed as the input shaft IN passes from the input shaft IN through the second member M2 and the high clutch H/C to, as an input, the second carrier C2.

In the planetary gear set G2, the second ring gear R2 rotates at a rotational speed that falls in a range between rotational speeds of these two input rotations, outputting a reduced speed rotation that is slightly reduced in speed as compared to the input rotation from the output gear OUT via the eighth member M8.

Fifth speed (5th) is accomplished by engaging the 3-5 reverse clutch 3-5R/C and the high clutch H/C.

Rotation that has the same rotational speed as the input shaft IN passes from the input shaft IN through the second member M2 and the high clutch H/C to, as an input, the second carrier C2.

Furthermore, rotation that has been reduced in the process of passing from the input shaft IN through the first member M1 and the planetary gear set G1 passes from the third member M3 through the 3-5 reverse clutch 3-5R/C and the sixth member M6 to, as an input, the second sun gear S2.

In the planetary gear set G2, the second ring gear R2 rotates due to these two input rotations, outputting an increased speed rotation that is slightly increased in speed as compared to the input rotation from the output gear OUT via the eighth member M8.

Sixth speed (6th) is accomplished by applying the high clutch H/C and the 2-6 brake 2-6B.

Rotation that has the same rotational speed as the input shaft IN passes from the input shaft IN through the second member M2 and the high clutch H/C to, as an input, the second carrier C2.

In the second planetary gear set G2, receiving a reaction force by the second sun S2 that is anchored to the transmission case TC due to engagement of the 2-6 brake 2-6/B, the second ring gear R2 rotates at increased speeds, outputting the increased rotation that is increased in speed as compared to speed for fifth speed from the output gear OUT via the eighth member M8.

Reverse (Rev) is accomplished by applying the 3-6 reverse clutch 3-5R/C and the low & reverse brake L&R/B.

Rotation that has been reduced in the process of passing from the input shaft IN through the first member M1 and the planetary gear set G1 passes from the third member M3 through the 3-5 reverse clutch 3-5R/C and the sixth member M6 to, as an input, the second sun gear S2.

Receiving a reaction force by the second carrier C2 that is anchored to the transmission case TC due to engagement of the low & reverse brake L&R/B, the second ring gear R2 rotates in the reverse direction at decreased speeds, outputting the decreased in speed rotation from the output gear OUT via the eighth member M8.

The automatic transmission controller 5 has failsafe control rule other than shift control rule, and processes operation based on this failsafe control rule. A control system for an automatic transmission (hereinafter called "a control system") is constituted by sections carrying out failsafe control, and it detects disengagement malfunction of at least one frictional engaging element based on inputs from various sensors 10~16 and controls engine rotational speed via the engine controller 4.

As shown in FIG. 1, a failsafe control component of the automatic transmission controller 5 has a disengagement malfunction determining section 51 that is so constructed and arranged as to determine whether or not a first frictional engaging element is disengagement malfunction, a danger-avoidance controlling section 52, and a disengagement malfunction preventing section 53 that is so constructed and arranged as to prevent a second frictional engaging element from having disengagement malfunction. As will be described later, in the first embodiment, the first frictional engaging element is the high clutch H/C, and the second frictional engaging element is the 2-6 brake 2-6/B.

The disengagement malfunction determining section 51 has a shift position detecting section 511 that is so constructed and arranged as to detect a selected range position and a selected shifting step; an abnormal gear ratio determination section 512 that is so constructed and arranged as to determine whether or not a gear ratio of the automatic transmission 3 is abnormal; and a vehicle deceleration abnormality determination section 513 that is so constructed and arranged as to determine whether or not the vehicle deceleration is abnormal. The disengagement malfunction determining section 51 determines whether or not the first frictional engaging element has disengagement malfunction based on the result of processing by the abnormal gear ratio determination section 512 and the vehicle deceleration abnormality determination section 513.

The gear ratio abnormality determination section 52 determines whether or not a current gear ratio that has been calculated by the automatic transmission controller 5 is a predetermined gear ratio. In particular, it determines whether or not the current gear ratio is an abnormal gear ratio for fourth speed that would materialize if the first frictional engaging element should have disengagement malfunction in D range first speed.

The vehicle deceleration abnormality determination section 513 determines whether or not the vehicle deceleration that is calculated by the automatic transmission controller 5 is greater than or equal to a predetermined value, and, in particular, whether or not the vehicle deceleration is greater than or equal to a lower limit value of the vehicle decelerations which warrant determination that interlock is occurring in the shifting step. Here, the interlock is the state in which the automatic transmission 3 fails to work well due to too much power added to the planetary gearing 31 when a frictional engaging element is engaged extra other than the frictional engaging element which is to be engaged in the shifting step.

The danger-avoidance controlling section 52 performs a danger-avoidance control depending on the situation when the disengagement malfunction determining section 51 determines that the first frictional engaging element has disengagement malfunction.

The disengagement malfunction preventing section 53 has a shift position detecting section (that is similar to the shift position detecting section 511 of the disengagement malfunction determining section 51, but omitted in FIG. 1), an engine rotational speed determining section 531 that is so constructed and arranged as to determine whether or not engine rotational speed is greater than or equal to a predetermined value, and an engine rotational speed controlling section 532 that is so constructed and arranged as to control engine rotational speed less than the above-mentioned predetermined value. When the disengagement malfunction determining section 51 determines that the first frictional engaging element has disengagement malfunction and a P range or N range, which is a non-running range, is selected, the disengagement malfunction preventing section 53 controls or restricts engine rotational speed lower than the rotational speeds which will cause occurrence of disengagement malfunction in the second frictional engaging element. In particular, the disengagement malfunction preventing section 53 outputs a fuel-cut command signal to the engine controller 4, reducing engine rotational speed via the engine controller 4.

As readily seen from FIG. 4, when the high clutch H/C has disengagement malfunction and P range or N range is selected, only the high clutch H/C remains engaged. As shown in FIG. 3, when the accelerator is stepped on and the engine 2 turns, torque is fed, as an input, to the second carrier C2 from the input shaft IN via the second member M2 and the high clutch H/C so that the second carrier C2 revolves at the same speed as the input shaft IN. On the other hand, the output gear OUT and the second ring gear R2 are held stationary when the vehicle is at a halt and the output speed is held zero.

Figure 6:
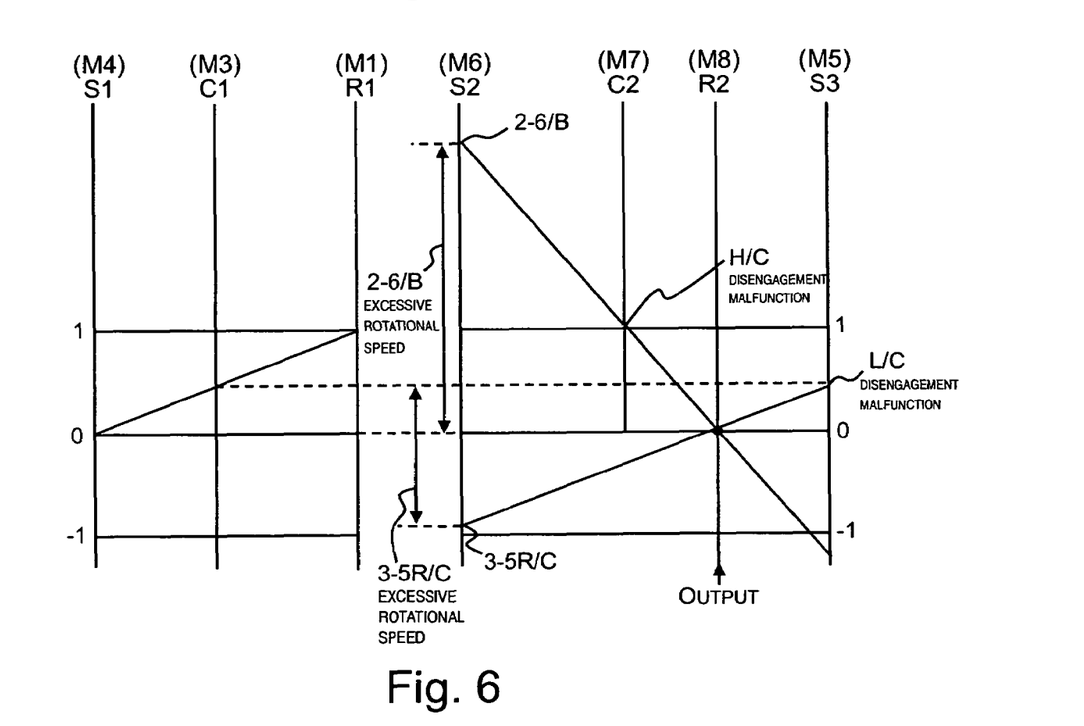
FIG. 6 is a speed shifting diagram representing operation of the change-speed planetary gearing when disengagement malfunction occurs.

FIG. 6 is a speed diagram showing the operation of the change-speed planetary gearing 31 at the time of disengagement malfunction outbreak. When the high clutch H/C has disengagement malfunction and the P range or N range is selected, turning the engine 2 at the time of a halt causes the second sun gear S2 and the sixth member M6 to turn at abnormally high speed, causing occurrence of excessively high rotational in the 2-6 brake 2-6B.

When the vehicle is at a halt upon selection of a non-running range position (P, N range), rotational of the eighth member M8 connected to the output shaft becomes zero. Then, if a high clutch H/C is arranged with respect to the one rotary member (for example, the sixth member M6) which is not adjacent the eighth rotary member M8 on the speed diagram, other rotary member (for example, the seventh member M7) will not rotate at relatively high speed, and the normal frictional engaging element arranged on the above-mentioned other rotary member will not break down due to rotation at high speed.

However, when, according to the first embodiment, the high clutch H/C is arranged with respect to the seventh member M7 which is adjacent the eighth member M8, on the speed diagram, connected to the output shaft, other sixth member M6 that is not adjacent the eighth member M8 (connected to the output shaft) will rotate at a speed higher than the seventh member M7 depending on a gear ratio of the planetary gearing. On this account, the 2-6 brake 2-6B arranged with respect to the sixth member M6 will rotate excessively. When, in particular, P range or N range is selected and accelerator pedal is stepped on, the engine rotates easily at high speed because the engine runs with no load, causing occurrence of excessively high rotational in the 2-6 brake 2-6B.

When the 2-6 brake 2-6B rotates excessively, friction materials (paper) are burnt, allowing plates to come into metal contact with each other. The plates which are in metal contact with each other become high in temperature, deformed, and stick to each other. In other words, the 2-6 brake 2-6B which has been normal now has disengagement malfunction.

Therefore, the control system determines whether or not the high clutch H/C has disengagement malfunction as the first stage in order to prevent disengagement malfunction of the 2-6 brake 2-6B. It is running at first, second, and third speed in D range (or M range) that the control system performs this determination of disengagement malfunction because normally the high clutch H/C is not engaged.

At first speed in D range, the low clutch L/C and the low one-way clutch L/OWC are engaged (See FIG. 4). When the high clutch H/C has disengagement malfunction, rotation having the same rotational speed as the input shaft IN is fed from the input shaft IN to the second carrier C2 and the seventh member M7, and the low one-way clutch L/OWC is automatically released (See FIG. 3). On this account, the low clutch L/C and the high clutch H/C are engaged, establishing the same combination of frictional engaging elements as that for running at fourth speed in D range. Therefore, the control system can determine that the high clutch H/C has disengagement malfunction upon finding that the actual gear ratio for fourth speed is established when the vehicle has started to move at first speed in D range.

On the other hand, for first speed in M range, with the low clutch L/C being engaged, the low & reverse brake L&R/B is engaged in substitution for the low one-way clutch L/OWC. Therefore, interlock occurs when the high clutch H/C has disengagement malfunction. Likewise, at second speed in D range (or M range), with the low clutch L/C being engaged, the 2-6 brake 2-6B is engaged, while, at third speed in D range (or M range), with the low clutch L/C being engaged, the 3-5 reverse clutch 3-5R/C is engaged. Therefore, interlock occurs when the high clutch H/C has disengagement malfunction. On this account, the control system can determine that the high clutch H/C has disengagement malfunction upon finding that abnormal vehicle deceleration occurs when driving at first speed in M range or at second or third speed in D range (or M range).

In addition, disengagement malfunction is less likely to occur in the high clutch H/C when a vehicle is running because there is a relative rotation between the clutch plates, but it is likely to occur when the relative rotation reduces after the vehicle has stopped or in the process that the clutch plates that were melted by friction heat get cold and harden in the state the vehicle stopped. Therefore, when making a determination whether or not a disengagement malfunction has occurred in the high clutch H/C, a determination based on gear ratio abnormality upon (re-start) start of the vehicle at first speed in D range plays a key role rather than a determination based on vehicle deceleration abnormality when the vehicle is running at first speed in M range or at second or third speed in D range (M range).

Because vehicle deceleration is influenced by various factors associated with running conditions other than an interlock phenomenon derived from a disengagement malfunction of a frictional engaging element, a determination based on vehicle deceleration is apt to lose accuracy. In contrast, because detection of a gear ratio is less influenced by such other factors, a determination based on gear ratio abnormality is more accurate than a determination based on vehicle deceleration abnormality.

Furthermore, because a disengagement malfunction determination that is based on gear ratio abnormality is carried out upon (re-start) or start of a vehicle, the control system can detect a disengagement malfunction immediately after starting a vehicle, providing higher safety.

As the second stage, when it detects a disengagement malfunction in the high clutch H/C, in order to prevent occurrence of a disengagement malfunction in the 2-6 brake 2-6/B, the control system carries out a disengagement malfunction prevention control that controls or restricts engine rotational speed lower than a predetermined level when a vehicle is at a standstill with a P or N range selected. Controlling or restricting engine rotational speed lowers rotational speed of the second carrier C2 (See FIG. 3), in turn lowering rotational speed of the second sun gear S2 and the sixth member M6. This prevents excessive rotational in the 2-6 brake 2-6/B, thus preventing disengagement malfunction of the 2-6 brake 2-6/B.

Figure 7:
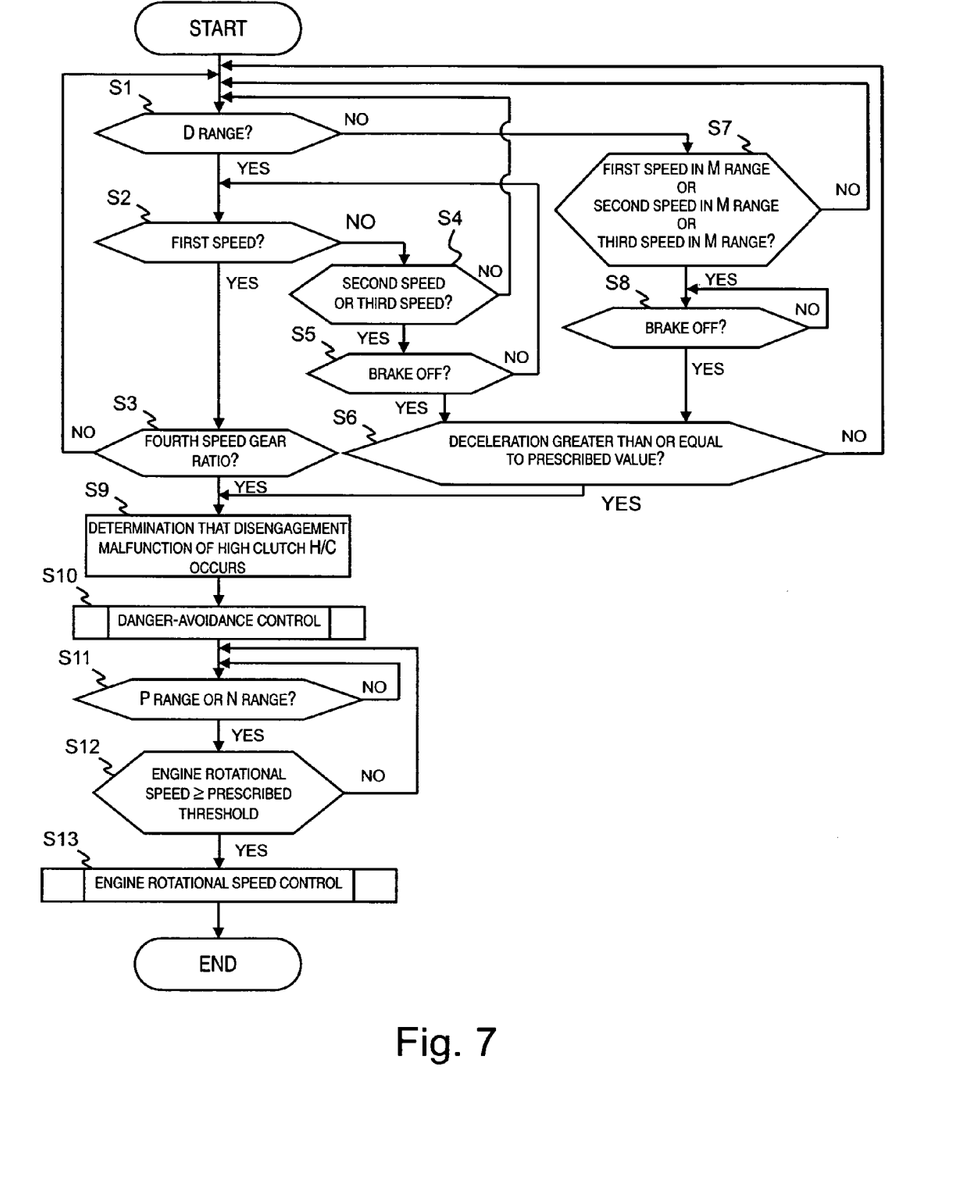
FIG. 7 is a flowchart showing an automatic transmission control program executed by the automatic transmission control system during engine starting in accordance with the illustrated embodiment of the present invention.

The following explains how the control system carries out a disengagement malfunction determination and a disengagement malfunction prevention control. FIG. 7 is its flow chart.

In steps S1~S9, the disengagement malfunction determining section 51 determines whether or not a disengagement malfunction has occurred in the high clutch H/C. Steps S1~S3 are provided for determining whether or not there is gear ratio abnormality when there is an order for first speed in D range. Steps S4~S6 are provided for detecting an interlock phenomenon based on vehicle deceleration abnormality when a vehicle is put in second speed or third speed in D range. Steps S7, S8 and S6 are provided for detecting an interlock phenomenon based on vehicle deceleration abnormality when the vehicle is put in first speed in M range or second speed in M range or third speed in M range.

In step S1, during running, the shift position detecting section 511 determines based on a signal outputted by the range position sensor 12 whether or not the selected range is D. When the selected range is D range, the processing shifts to step S2, and when the selected range is not D range, the processing shifts to step S7.

In step S2, the shift position detecting section 511 detects a shifting order signal, which has been outputted by the automatic transmission controller 5 to the automatic transmission 3, to determine whether or not the shifting order signal indicates first speed. When the shifting order signal indicates first speed, the processing shifts to step S3, and when the shifting order signal does not indicate first speed, the processing shifts to step S4.

In step S3, the gear ratio abnormality determination section 512 determines whether or not a gear ratio, which has been calculated by the automatic transmission controller 5, is for fourth speed. When the gear ratio is for fourth speed, the processing shifts to step S9, and when the gear ratio is not for fourth speed, the processing returns to step S1.

In step S4, the shift position detecting section 511 detects a shifting order signal, which has been outputted by the automatic transmission controller 5 to the automatic transmission 3, to determine whether or not the shifting order signal indicates second or third speed. When the shifting order signal indicates second or third speed, the processing shifts to step S5, and when the shifting order signal does not indicate second or third speed, the processing returns to step S1.

In step S5, in order to calculate the vehicle deceleration accurately in step S6, the vehicle deceleration abnormality determination section 513 determines based on the detected signal by the brake sensor 15 whether or not the brake pedal is stepped on. When the brake pedal is not stepped on (brake is "OFF"), the processing shifts to step S6, and when the brake pedal is stepped on, the processing returns to step S2.

In step S6, the vehicle deceleration abnormality determination section 513 determines whether or not a vehicle deceleration, which has been calculated by the automatic transmission controller 5, is greater than or equal to a predetermined value. When the vehicle deceleration is greater than or equal to the predetermined value, the processing shifts to step S9, and when the vehicle deceleration is less than the predetermined value, the processing return to step S1. In addition, because the vehicle deceleration is calculated after it has been confirmed in step S5 that the brake is OFF, the vehicle deceleration can be calculated without any influence by ON/OFF of the brake.

In step S7, the shift position detecting section 511 determines based on a signal outputted by the range position sensor 12 whether or not the selected range is M range, and it determines whether or not the selected shifting step is first speed or second speed or third speed when the selected range is M range. When first or second or third speed in M range is selected, the processing shifts to step S8, and when first or second or third speed in M range is selected, the processing returns to step S1.

In step S8, the vehicle deceleration abnormality determination section 513 determines based on the detected signal by the brake sensor 15 whether or not the brake pedal is stepped on. When the brake pedal is not stepped on, the processing shifts to step S6, and when the brake pedal is stepped on, the processing returns to step S8.

In step S6, the vehicle deceleration abnormality determination section 513 determines whether or not a vehicle deceleration is greater than or equal to the predetermined value. When the vehicle deceleration is greater than or equal to the predetermined value, the processing shifts to step S9, and when the vehicle deceleration is less than the predetermined value, the processing return to step S1.

In step S9, the disengagement malfunction determining section 51 determines that a disengagement malfunction occurs in the high clutch H/C, and the processing shifts to step S10. In other words, it determines that the high clutch H/C has disengagement malfunction upon detection of the gear ratio for fourth speed in D range (S1~S3), and it determines that the high clutch H/C has disengagement malfunction upon detection of interlock phenomenon by appearance of vehicle deceleration abnormality when the vehicle is put in first, second or third speed in M range or it is put in second or third speed in D range (S4~S8).

In step S10, the danger-avoidance controlling section 52 performs a danger-avoidance control.

In the case a determination based on gear ratio abnormality shows there is a disengagement malfunction, when the high clutch H/C happens to be released, the automatic transmission suddenly shifts from running in four speed to running freely, giving the vehicle driver a feel of incongruity. In order to avoid this feel of incongruity, the transmission is fixedly put in four speed shifting step. In particular, the danger-avoidance controlling section 52 outputs an engagement order on the low clutch L/C at the same time it outputs an engagement order to secure engagement of the high clutch H/C by applying hydraulic pressure thereto.

In the case a determination based vehicle deceleration abnormality shows there is a disengagement malfunction upon detection of interlock phenomenon, the danger-avoidance controlling section 52 does not usually perform any danger-avoidance control. However, you may change gears into a suitable danger-avoidance shifting step. For example, the danger-avoidance controlling section 52 can determine a suitable danger-avoidance shifting step utilizing disengagement malfunction of the high clutch H/C and change gears into this shifting step at the same time it outputs release orders on all of the frictional engaging elements to put the automatic transmission into neutral.

In steps S11~S13, the disengagement malfunction preventing section 53 performs a control processing to prevent occurrence of disengagement malfunction within the 2-6 brake 2-6/B.

In step S11, the shift position detecting section 511 determines based on a signal outputted by the range position sensor 12 whether or not the selected range is P range or N range. When P range or N range is selected, the processing shifts to step S12, and when other range is selected, the processing returns to step S11. Because the 2-6 brake 2-6/B may be subjected to excessively high rotational (See FIG. 6) when, in P range or N range where no load is applied to the engine, the accelerator pedal is stepped on; the following control is carried out in P range or N range.

In step S12, receiving an engine rotational signal detected by the engine rotational sensor 10 and outputted by the engine controller 4, an engine rotational determining section 531 determines whether or not the engine rotational speed is greater than or equal to a predetermined threshold. When the engine rotational speed is greater than or equal to the prescribed threshold, the processing shifts to step S13, and when it is less than the prescribed threshold, the processing returns to step S11.

In particular, the prescribed threshold is 3000 rpm in the illustrated embodiment. This rotational speed is lower than the engine rotational speed (for example, 7000 rpm) which is determined to prevent occurrence of an excessive engine rotational (so called "overspeed") on the assumption that all of the frictional engaging elements operate normally. In other words, it is the lower limit of the engine rotational speeds which cause chain of occurrence of disengagement malfunction within the second frictional engaging element that is the 2-6 brake 2-6/B when the first frictional engaging element that is the high clutch H/C has disengagement malfunction.

In step S13, an engine rotational controlling section 532 outputs a fuel cut order signal to the engine control unit 4, reducing fuel supply to the engine 2, controlling the engine rotational speed lower than the prescribed threshold (3000 rpm).

Figure 8:
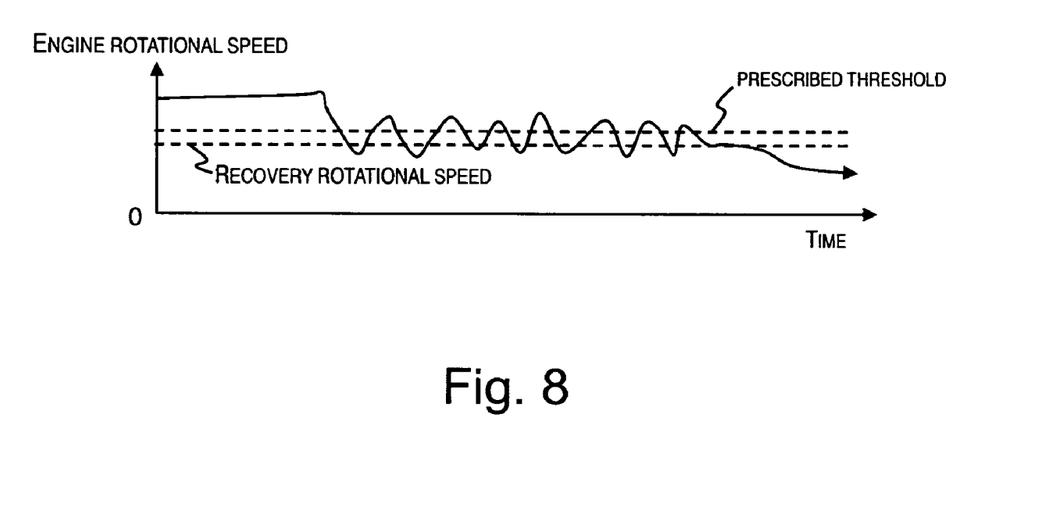
FIG. 8 is a graph the plots engine rotational speed versus time to show a change in the engine rotational speed over time due to outputting a fuel-cut command signal and stopping the output of the fuel-cut command signal.

In addition, for engine rotational speed control within a range less than the prescribed threshold, the engine rotational controlling section 532 stops outputting the fuel cut order signal when the engine rotational speed drops equal to or below a predetermined value (recovery engine rotational speed). This action allows the engine rotational speed to rise again. Therefore, as shown in FIG. 8, the engine rotational speed goes up and down at every beginning of outputting the fuel cut order signal and ending of outputting it. This transmits the occurrence of abnormal event to the driver.

The first embodiment of a control system for an automatic transmission has the following effects as listed below.

The automatic transmission control system of the first embodiment is employed in the automatic transmission 3, which establishes a target shifting step by engagement and release of the high clutch H/C, the 2-6 brake 2-6/B, and the plurality of the other of the frictional engaging elements L/C, L&R/B and L/OWC, and changes speed of power from the engine 2 to output the speed changed power. This automatic transmission control system includes the disengagement malfunction determining section 51 that determines whether or not the high clutch H/C (first frictional engaging element) has a disengagement malfunction, and the disengagement malfunction preventing section 53 that prevents disengagement malfunction of the 2-6 brake 2-6/B (second frictional engaging element) by lowering the rotational speed of the engine 2 (main power source) to a level which will prevent the disengagement malfunction in the 2-6 brake 2-6/B (second frictional engaging element), when the disengagement malfunction determining section determines 51 that the disengagement malfunction of the high clutch H/C (first frictional engaging element) exists while the automatic transmission 3 is in non-running range (P range or N range). Rotational speed of the engine 2 lower than the rotational speed (the lower limit is 3000 rpm) which will cause occurrence of disengagement malfunction in the 2-6 brake 2-6/B.

Therefore, it is now possible to prevent occurrence of secondary disengagement malfunction in the 2-6 brake 2-6/B that is the second frictional engaging element beforehand by determining that disengagement malfunction occurred in the high clutch H/C that is the first frictional engaging element in time when it occurred. On this account, it is not necessary to secure capacity of the high clutch H/C more than required. In addition, unnecessary control can be avoided by limiting control for restriction on engine rotational speed when disengagement malfunction is likely to occur in the high clutch H/C. Therefore, this embodiment has effect of compressing a rise of a cost and also effect that the inconveniences that the layout degree of freedom and performance are limited do not occur.

The automatic transmission 3 possesses the change speed planetary gearing 31, which includes the eighth member M8 fixed to the output gear OUT, the seventh member M7 that is adjacent to the eighth member M8 in a speed diagram, and the sixth member M6 that is not adjacent to the eighth member M8 in the speed diagram, and the high clutch H/C is arranged on the seventh member M7, and the 2-6 brake 2-6/B is arranged on the sixth member M6.

Unnecessary control can be avoided by limiting control for restriction on engine rotational speed when disengagement malfunction is likely to occur in the high clutch H/C that satisfies the above-mentioned conditions. Therefore, because excessive control is not performed, this embodiment has effect that the inconveniences that the driver has a feel of incongruity and performance of the automatic transmission 3 drops do not occur.

The disengagement malfunction determining section 51 determines that the high clutch H/C has disengagement malfunction by determining whether or not there is gear ratio abnormality in the automatic transmission 3 when a first speed in D range, which is achieved by engaging the low clutch L/C that is other frictional engaging element than the high clutch H/C and activating the low one-way clutch L/OWC, is being ordered.

When first speed in D range, which uses the low one-way clutch L/OWC, is ordered, interlock phenomenon does not occur even if disengagement malfunction of the high clutch H/C that is arranged on the seventh member M7 occurs, and fourth speed that is different from the ordered first speed in D range is established (See FIG. 5) because the low one-way clutch L/OWC only regulates rotational of the seventh member M7 and second carrier C2 in one direction. Therefore, as different from the case when a shifting step that is established by engagement of two frictional engaging elements without using the one-way clutch is ordered, it is possible to determine occurrence of disengagement malfunction of the high clutch H/C by determining occurrence of gear ratio abnormality. Here, because detection of a gear ratio is less influenced by other factors, a determination based on gear ratio abnormality is more accurate than a determination based on vehicle deceleration abnormality. Therefore, the determination on disengagement malfunction of the high clutch H/C becomes more precise, making it possible to prevent disengagement malfunction of the 2-6 brake 2-6/B more effectively. In addition, because excessive control is not performed, this embodiment has effect that the inconveniences that the driver has a feel of incongruity and performance of the automatic transmission 3 drops do not occur.

The disengagement malfunction determining section 51 determines whether or not disengagement malfunction of the high clutch H/C occurs by determining gear ratio abnormality of the automatic transmission 3 when first speed in D range that is a start-up shifting step is ordered.

When making a determination whether or not a disengagement malfunction has occurred in the high clutch H/C, a determination based on gear ratio abnormality upon (re-start) start of the vehicle at first speed in D range plays a key role. In addition, because detection of a gear ratio is less influenced by other factors, a determination based on gear ratio abnormality is more accurate than a determination based on vehicle deceleration abnormality. Furthermore, because a disengagement malfunction determination that is based on gear ratio abnormality is carried out upon (re-start) or start of a vehicle, the control system can detect a disengagement malfunction immediately after starting a vehicle. Therefore, this embodiment has an effect that it is possible to prevent disengagement malfunction of the 2-6 brake 2-6/B while securing higher safety.

Second Embodiment

The constitution of the second embodiment of a control system for an automatic transmission is the same as that of the first embodiment.

The second embodiment of a control system is different from the first embodiment in that it detects disengagement malfunction of a low clutch L/C (not a high clutch) as the first frictional engaging element, and performs control processing to prevent disengagement malfunction of a 3-5 reverse clutch 3-5/C (not a 2-6 brake 2-6/B) as the second frictional engaging element. In addition, a disengagement malfunction determining section 51 according to the second embodiment determines whether or not disengagement malfunction of the low clutch L/C occurs based mainly on a hydraulic pressure switch signal as different from the first embodiment. The other actions of the second embodiment are the same as those of the first embodiment.

As readily seen from FIG. 3, when the low clutch L/C has disengagement malfunction and P range or N range is selected, only the low clutch L/C remains engaged. When the accelerator is stepped on and the engine 2 turns, rotational of a first member M1 and a first ring gear R1, which are fixed to an input shaft IN, is reduced in speed via a first carrier C1, and the reduced, in speed, rotational in positive direction (the same rotational direction as the input shaft IN) is fed, as an input, to a third member M3 fixed to the first carrier C1 (See FIG. 6).

The rotational of the third member M3 is transmitted to the clutch plates of the 3-5 reverse clutch 3-5R/C which are fixed to the third member M3, and at the same time it is transmitted via the low clutch L/C to the fifth member M5 and a third sun gear S3. Because rotational of an output gear OUT and a second ring gear R2 is fixedly held zero when the vehicle is at a halt, rotational of the third sun gear S3 in the positive direction is changed to rotational of a second carrier C2 in the negative direction. The rotational of the second carrier C2 is transmitted to a second sun gear S2, causing the second sun gear S2 to revolve in the negative direction at increased speed. On this account, a sixth member M6 fixed to the second sun gear S2 revolves in the negative direction at such increased speed (See FIG. 6).

Therefore, the clutch plates of the 3-5 reverse clutch 3-5R/C which are fixed to the sixth member M6 revolve in the negative direction. On the other hand, the clutch plates of the 3-5 reverse clutch 3-5R/C which are fixed to the third member M3 revolves in the positive direction. Therefore, as shown in FIG. 6, an excessive rotational occurs between the clutch plates of the 3-5 reverse clutch 3-5R/C.

When the vehicle is at a halt upon selection of a non-running range position (P, N range), rotational of the eighth member M8 connected to the output shaft becomes zero. Then, according to the second embodiment, when the fifth member M5, which the low clutch L/C is arranged on, is adjacent in a speed diagram to the eighth member M8 connected to the output shaft, other or the sixth member M6, which is not adjacent in the speed diagram to the eighth member M8 (connected to the output shaft) turns at higher rotational depending on the gear ratio of a planetary gearing. On this account, a high rotational of the 3-5 reverse clutch 3-5R/C occurs, causing occurrence of disengagement malfunction (adherence) of the 3-5 reverse clutch 3-5R/C.

As a cause of disengagement malfunction (false engagement) of the low clutch L/C, other than abnormality that the clutch plates are adhered, there is abnormality that hydraulic pressure does not come out of the low clutch L/C because a pressure regulator valve 40b, which regulates pressure applied to the low clutch L/C, does not move to operate appropriately due to impurities mixed into the pressure regulator valve 40b. Because capacity of the low clutch L/C is usually set great and there are few cases that the clutch plates are stuck and adhered when the low clutch L/C is subjected to excessive relative rotation between the clutch plates, it is thought that the main cause to induce disengagement malfunction of the low clutch L/C is the latter.

Therefore, the control system according to this second embodiment determines, as the first stage, whether or not disengagement malfunction of the low clutch L/C occurs by determining whether or not there is hydraulic pressure supply to the low clutch L/C in order to prevent disengagement malfunction of the 3-5 reverse clutch 3-5R/C. In particular, it makes such determination based on an ON/OFF signal of a hydraulic pressure switch 16a arranged on a hydraulic fluid line 65 to the low clutch L/C.

A disengagement malfunction determining section 51 determines that hydraulic pressure is supplied to the low clutch L/C for false engagement and disengagement malfunction of the low clutch L/C occurs when the signal of the hydraulic pressure switch 16a, which the automatic transmission controller 5 detects, is ON level in such shifting steps (for example, fifth speed and sixth speed) where normally the low clutch L/C will not be engaged.

Further, the trouble determination may be performed based on gear ratio abnormality or vehicle deceleration abnormality in the same manner as the first embodiment.

The danger-avoidance control determines a suitable danger-avoidance shifting step that utilize disengagement malfunction of the low clutch L/C and changes gears into the shifting step upon determination, based on the ON/OFF signal of the hydraulic pressure switch 16a, that disengagement malfunction of the low clutch L/C occurs.

The control system according to this second embodiment performs, as the second stage, disengagement malfunction prevention control to restrict engine rotational speed lower than a predetermined value in P range or N range upon determination that disengagement malfunction of the low clutch L/C occurs in order to prevent occurrence of disengagement malfunction of the 3-5 reverse clutch 3-5R/C. In particular, when the low clutch L/C that is the first frictional engaging element has disengagement malfunction, the control system controls or restricts engine rotational speed lower than or equal to the lower limit of the rotational speeds which will cause occurrence of disengagement malfunction of the 3-5 reverse clutch 3-5R/C that is the second frictional engaging element.

Controlling or restricting engine rotational speed lowers rotational speed of the first carrier C1 (See FIG. 3), in turn lowering rotational speed, in positive direction, of those plates of the 3-5 reverse clutch 3-5R/C which are fixed to the third member M3 and lowering rotational speed, in negative direction, of those plates of the 3-5 reverse clutch 3-5R/C which are fixed to the sixth member M6. This prevents excessive rotation in the 3-5 reverse clutch 3-5R/C, thus preventing disengagement malfunction of the 3-5 reverse clutch 3-5R/C.

The effects of the second embodiment are the same as those of the first embodiment. In other words, it is now possible to prevent occurrence of secondary disengagement malfunction in the 3-5 reverse clutch 3-5R/C that is the second frictional engaging element beforehand by determining that disengagement malfunction occurred in the low clutch L/C that is the first frictional engaging element in time when it occurred. On this account, it is not necessary to secure capacity of the low clutch L/C more than required. In addition, unnecessary control can be avoided by limiting control for restriction on engine rotational speed when disengagement malfunction is likely to occur in the low clutch L/C. Therefore, this embodiment has effect of compressing a rise of a cost and also effect that the inconveniences that the layout degree of freedom and performance are limited do not occur.

The automatic transmission 3 possesses a change speed planetary gearing 31, which includes the eighth member M8 fixed to the output gear OUT, the fifth member M5 that is adjacent to the eighth member M8 in the speed diagram, and the sixth member M6 that is not adjacent to the eighth member M8 in the speed diagram, and the low clutch L/C is arranged on the fifth member M5, and the 3-5 reverse clutch 3-5R/C is arranged on the sixth member M6. Unnecessary control can be avoided by limiting control for restriction on engine rotational speed when disengagement malfunction is likely to occur in the low clutch L/C that satisfies the above-mentioned conditions. Therefore, because excessive control is not performed, this embodiment has effect that the inconveniences that the driver has a feel of incongruity and performance of the automatic transmission 3 drops do not occur.

Furthermore, the second embodiment of control system is different from the first embodiment in that it determines disengagement malfunction of the low clutch L/C based on the hydraulic pressure switch signal and thus has effect that it can determine disengagement malfunction with good precision.

Other Embodiments

The preceding description has explained the best mode to implement the present invention based on the first and second embodiments, but the concrete constitution of the present invention should not be limited to these first and second embodiments. The present invention includes any design changes falling in the range which does not deviate from the subject matter of the invention.

For example, the control system according to present invention is applicable to an automatic transmission having a gear train (a planetary gear train) different from that of the first embodiment.

In addition, the disengagement malfunction preventing section 53 used in the first and second embodiments performs control to restrict engine rotational speed in P range or N range during a stop, nut it may perform the above-mentioned control in N range during a run as well as during a stop.

Furthermore, the disengagement malfunction determining section 51 used in the first embodiment detects disengagement malfunction by determining gear ratio abnormality when first speed in D range is being ordered. However, when the control system according to the present invention is applied to a gear train different from that of the first embodiment, the control system may detect disengagement malfunction of the above-mentioned first frictional engaging element by determining gear ratio abnormality during ordering a shifting step, if available, which is achieved by engagement of other frictional engaging element than the first frictional engaging element (corresponding to the high clutch H/C in the first embodiment) and action of a one-way clutch as well as first speed in D range. This is because, when the one-way clutch is employed, interlock phenomenon does not occur even if the disengagement malfunction occurs and a shifting step other than the shifting step being ordered is established. For example, in an automatic transmission that is capable of starting a vehicle at second speed using action of a one-way clutch, the control system may detect disengagement malfunction by determining gear ratio abnormality during ordering the second speed for starting the vehicle.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission control system comprising:
   a disengagement malfunction determining section configured to determine a disengagement malfunction with a first frictional engaging element from among a plurality of frictional engaging elements of an automatic transmission in which the frictional engaging elements are selectively engaged and disengaged to change a rotational speed of a main power source; and
   a disengagement malfunction preventing section configured to prevent disengagement malfunction of a second frictional engaging element from among the frictional engaging elements of the automatic transmission by lowering the rotational speed of the main power source to a level which will prevent the disengagement malfunction in the second frictional engaging element, when the disengagement malfunction determining section determines that the disengagement malfunction of the first frictional engaging element exists while the automatic transmission is in non-running range.

2. The automatic transmission control system as set forth in claim 1, wherein the disengagement malfunction determining section is further configured to determine the disengagement malfunction of the first frictional engaging element exists where the automatic transmission includes a change speed planetary gearing having a first rotary member fixed to an output gear, a second rotary member adjacent to the first rotary member in a speed diagram, and a third rotary member non-adjacent to the first rotary member in the speed diagram, and the first frictional engaging element being arranged on the second rotary member, and the second frictional engaging element being arranged on the third rotary member.

3. The automatic transmission control system as set forth in claim 1, wherein the disengagement malfunction determining section is further configured to determine the disengagement malfunction of the first frictional engaging element exists by determining whether a gear ratio abnormality exists in the automatic transmission when shifting, which is achieved by selectively engaging selective other ones of the frictional engaging element other than the first frictional engaging element and activating a one-way clutch.

4. The automatic transmission control system as set forth in claim 3, wherein the disengagement malfunction determining section is further configured to determine the gear ratio abnormality when the shifting is a start-up shift.

5. An automatic transmission control system comprising:

disengagement malfunction determining means for determining a disengagement malfunction with a first frictional engaging element from among a plurality of frictional engaging elements of an automatic transmission in which the frictional engaging elements are selectively engaged and disengaged to change a rotational speed of a main power source; and disengagement malfunction preventing means for preventing disengagement malfunction of a second frictional engaging element from among the frictional engaging elements of the automatic transmission by lowering the rotational speed of the main power source to a level which will prevent the disengagement malfunction in the second frictional engaging element, when the disengagement malfunction determining means determines that the disengagement malfunction of the first frictional engaging element exists while the automatic transmission is in non-running range.

6. A method of controlling an automatic transmission comprising:

determining a disengagement malfunction with a first frictional engaging element from among a plurality of frictional engaging elements of the automatic transmission in which the frictional engaging elements are selectively engaged and disengaged to change a rotational speed of a main power source; and preventing disengagement malfunction of a second frictional engaging element from among the frictional engaging elements of the automatic transmission by lowering the rotational speed of the main power source to a level which will prevent the disengagement malfunction in the second frictional engaging element, upon determining that the disengagement malfunction of the first frictional engaging element exists while the automatic transmission is in non-running range.

* * * * *